(12) United States Patent
Chalasani et al.

(10) Patent No.: US 6,401,946 B1
(45) Date of Patent: Jun. 11, 2002

(54) COMPOSITE BATTERY STAND WITH INTEGRAL SPILL CONTAINMENT

(76) Inventors: Subhas Chandra Chalasani, 4417 Brigade Ct., Plano, TX (US) 75024; Keith Bruce Kelley, 9602 Old Nacogdoches Trail, Forney, TX (US) 75126; Roy Kuipers, 5418 Ranger Dr., Rockwall, TX (US) 75032; Steve McCluer, 16206 Springcreek Rd., Dallas, TX (US) 75248; K. A. Murugesamoorthi, 4020 Christopher Way, Plano, TX (US) 75024

( * ) Notice: Subject to any disclaimer, the term of this patent is extended or adjusted under 35 U.S.C. 154(b) by 0 days.

(21) Appl. No.: 09/568,107

(22) Filed: May 10, 2000

(51) Int. Cl.[7] .............................................. A47B 47/00
(52) U.S. Cl. .................................................... 211/188
(58) Field of Search .............................. 211/188, 26, 62

(56) References Cited

U.S. PATENT DOCUMENTS

| | | | | | |
|---|---|---|---|---|---|
| 492,359 | A | * | 2/1893 | Merker | 211/62 |
| 1,290,290 | A | * | 1/1919 | Morio, Jr. | 211/62 |
| 4,467,927 | A | * | 8/1984 | Nathan | 211/188 |
| 4,843,975 | A | * | 7/1989 | Welsch et al. | 211/188 |
| 5,261,541 | A | * | 11/1993 | Li | 211/62 |
| 5,304,434 | A | * | 4/1994 | Stone | 429/99 |
| 5,964,163 | A | * | 10/1999 | Cohen | 211/188 |
| 6,015,053 | A | * | 1/2000 | Sheng | 211/188 |
| 6,202,867 | B1 | * | 3/2001 | Di Blasi et al. | 211/188 |

* cited by examiner

Primary Examiner—Alvin Chin-Shue
Assistant Examiner—Sarah Purol

(57) ABSTRACT

An integral spill containment system for a composite battery stand having a shelf adapted to receive at least one battery subject to leaking electrolyte, a method of containing the electrolyte and a composite battery stand incorporating the system or the method. In one embodiment, the system includes (1) an aperture, located in the shelf, adapted to channel the electrolyte away from the shelf and (2) a removable tray, located under the shelf and within a footprint of the battery stand, adapted to collect the electrolyte via the aperture thereby containing the electrolyte within the footprint of the battery stand.

24 Claims, 4 Drawing Sheets

COMPOSITE BATTERY STAND WITH INTEGRAL SPILL CONTAINMENT

CROSS-REFERENCE TO RELATED APPLICATIONS

This application is related to U.S. patent application Ser. No. CHALASANI 13-3-12, entitled "ELECTRICAL DISTRIBUTION SYSTEM FOR COMPOSITE BATTERY STAND AND COMPOSITE BATTERY STAND INCORPORATING THE SAME," to Chalasani, et al., filed on DATE. The above-listed application is commonly assigned with the present invention and is incorporated herein by reference as if reproduced herein in its entirety.

TECHNICAL FIELD OF THE INVENTION

The present invention is directed, in general, to battery stands and, more specifically, to a spill containment system for a composite battery stand, a method of containing electrolyte within a footprint of the battery stand and a battery stand employing the system or the method.

BACKGROUND OF THE INVENTION

The traditional reliability of telecommunication systems that users have come to expect and rely upon is based, in part, on the reliance on redundant equipment and power supplies. Telecommunication switching systems, for example, route tens of thousands of calls per second. The failure of such systems, due to either equipment breakdown or loss of power, is unacceptable since it may result in a loss of millions of telephone calls and a corresponding loss of revenue.

Power plants, such as battery plants, address the power loss problem by providing the system with an energy reserve (e.g., a battery) in the event of the loss of primary power to the system. A battery plant generally operates as follows. The battery plant includes a number of batteries, rectifiers and other power distribution equipment. The primary power is produced by the rectifiers, which convert an AC main voltage into a DC voltage to power the load equipment and to charge the batteries. The primary power may, however, become unavailable due to an AC power outage or the failure of one or more of the rectifiers. In either case, the batteries then provide power to the load. Redundant rectifiers and batteries may be added to the battery plant as needed to increase the availability of the battery plant.

Space is normally a concern when constructing a battery plant. This is because it is common for a battery plant to be located on site, near the telecommunications system. The battery plant typically houses all of the batteries needed to provide power during a power outage. The tremendous amount of space necessary to accommodate the battery plants has prompted the design of battery stands capable of holding a number of batteries. Battery stands utilize the available space more efficiently by allowing the batteries to be vertically stacked.

Battery stands are typically constructed of steel members, which may be bolted or welded together to form a desired battery stand. Many different sizes and shapes of batteries may be employed in battery plants, including flooded round and rectangular cell batteries, valve regulated batteries and gel batteries. Because of the different sizes and shapes of the batteries, the battery stands must be capable of adapting to the different dimensional requirements of each battery. In response to the wide variety of batteries, an "erector set" type of structure was developed wherein each battery stand includes steel beam members that are bolted together to form a battery stand adapted to receive a particular battery.

Assembling a battery stand, whether at the factory or on site, generally requires a tremendous amount of time and effort. The time required to assemble a medium size battery stand may easily be two to three days. Equally frustrating problems may arise whether one orders a preassembled battery stand or one assembled on-site. Preassembled battery stands require the end user to thoroughly determine all of the requirements of the battery stand, including any constraints particular to the building in which the stand will be placed. Furthermore, the preassembled battery stands are typically cumbersome to handle and, due to their great weight, may be extremely expensive to ship. In addition to the time concerns discussed above, assembling the battery stand on site limits the end user to the parts available at the assembly site. With so many small brace members to assemble such a large structure, it is inevitable that some parts will be missing when needed to assemble a customized battery stand for a particular location.

Again, the steel battery stand has many undesirable features as well. Because the battery stand includes steel brace members, it is common for the battery stand to weigh several hundred pounds. This creates a major problem both with shipping the stand to the site, which can become very expensive, and with moving the stand within the battery plant.

Batteries housed on the battery stand may explode or leak due to, among other things, age, excessive use, manufacturing defect or abuse. The electrolyte (e.g., acid) in the batteries may be extremely corrosive, causing the steel members of the battery stand to deteriorate. When the electrolyte is spilled on the steel surface of the battery stand, the surface must typically be replaced. Due to the extensive number of batteries that may leak and the extensive number of brace members that should be removed and replaced, maintenance of the battery stand can be a time consuming and expensive process.

Further, the steel battery stand is electrically conductive and may thus create a possibility of electrical shock to those who may come in contact with the battery stand. A requirement of the steel battery stand is that it should be painted prior to use. This is both an aesthetic requirement and a safety requirement. The battery stands may be accessed many times a day. The battery stands, therefore, should be painted to be aesthetically pleasing. Most steel battery stands, or at least the brace members of the stands, are painted prior to being shipped on site. During installation, however, the battery stand will likely be subjected to nicks and scratches such that additional touch-up painting is required. In addition to providing an aesthetically pleasing surface, the electrically insulative properties of the paint may protect those working in close proximity to the steel battery stand from electrical shock.

There is also a requirement that the battery stand be anchored to a foundation of the battery plant so as to prevent any movement of the battery stand. The ground mounting device typically depends on the location of the battery plant within the various seismic zones as designated by Bellcore GR63-CORE or other seismic building codes. Currently, for battery plants located in seismic zones subject to greater seismic activity, the battery stand is required to be bolted to the ground with anchor bolts that are mounted in the concrete foundation of the battery plant. A rigid brace, connected to an anchor bolt on one side of the battery stand, may be placed across the top of the battery stand and connected to another anchor bolt on the other side of the battery stand. The rigid brace is typically employed on both ends of each battery stand. Alternatively, the battery stand may be simply secured to the concrete foundation via an L-shaped bracket placed at the base of each corner of the battery stand. Whether using L-shaped brackets or a rigid brace, the usable floor space around the battery stand is decreased by the presence of the anchoring system. Both methods of anchoring the battery stand typically require two to four inches of floor space surrounding the battery stand.

As of December 1998, the Uniform Fire Code was updated to require that a spill containment system be employed to contain the electrolyte leaking from the batteries. Spill containment in battery stands is presently handled by a barrier (generally formed from concrete, steel or plastic) four inches tall and extending one inch beyond a footprint of the battery stand. The use of the barrier requires that the exact location of the battery stand be known prior to installation, such that the barrier may be properly positioned. The permanence of the barrier structure creates a problem with battery stands that are subject to being moved, as the battery plant grows. Further, the barriers are typically sealed with an epoxy that is resistant to the corrosive effects of the electrolyte. The epoxy sealant not only requires an additional step in the set up of the battery stand, but also bonds to the foundation of the battery plant, such that it generally cannot be removed without damage to the foundation of the battery plant. Additionally, once the spilled electrolyte is contained within the barrier, the electrolyte should be removed as soon as possible. The small amount of working space, as described above, may hamper the process of removing the electrolyte from under the battery stand.

Accordingly, what is needed is a composite battery stand having a spill containment system and a ground mounting device that rectifies the deficiencies associated with battery stands of the prior art.

SUMMARY OF THE INVENTION

To address the above-described deficiencies of the prior art, the present invention provides, for use with a composite battery stand having a shelf adapted to receive at least one battery subject to leaking electrolyte, an integral spill containment system, a method of containing the electrolyte and a composite battery stand incorporating the system or the method. In one embodiment, the system includes an aperture, located in the shelf, that channels the electrolyte away from the shelf. The system further includes a removable tray, located under the shelf and within a footprint of the battery stand. The removable tray collects the electrolyte via the aperture, thereby containing the electrolyte within the footprint of the battery stand.

The present invention introduces, in one aspect, the broad concept of containing electrolyte, such as acid, spilled from a battery in a battery stand within a removable tray located under and within a footprint of the battery stand. The integral spill containment system advantageously channels the electrolyte away from the shelf containing the leaky battery and collects the electrolyte in the removable tray.

The battery stand is preferably manufactured from a composite material, such as plastic, fiberglass, ceramic, sheet molding compound or structural foam. Of course, other composite materials may be employed as may be advantageous in a particular application.

In one embodiment of the present invention, the shelf includes a flame retardant composite material. In a preferred embodiment, the shelf may be formed from a material that meets or exceeds U.L. 94 V-0. Those skilled in the pertinent art are familiar with a variety of flame retardant materials.

In one embodiment of the present invention, the shelf includes a corrosion resistant composite material. In a preferred embodiment, the shelf is designed to receive a plurality of batteries subject to leaking electrolyte. The shelf is thus preferably resistant to the corrosive effects of the leaking electrolyte.

In one embodiment of the present invention, the shelf includes a recessed section therein to receive the battery. The battery may thus be secured within the recessed section to meet seismic requirements. Of course, other methods of securing the battery in the battery stand are well within the broad scope of the present invention.

In one embodiment of the present invention, the removable tray contains an electrolyte neutralizing material. The electrolyte neutralizing material may thus neutralize the electrolyte to allow safe disposal thereof. In another embodiment, the removable tray contains an electrolyte trapping material. The electrolyte trapping material may trap or absorb the electrolyte to allow safe disposal thereof.

In one embodiment of the present invention, the shelf is a bottom shelf of the battery stand. In this embodiment, the battery stand further includes a spacer and a second shelf that stacks on and interlocks with the bottom shelf. The stand may thus be shipped unassembled and assembled on site with less effort than is ordinarily required by other types of battery stands (e.g., steel battery stands).

In one embodiment of the present invention, the battery is selected from the group consisting of (1) a flooded electrolyte battery, (2) a valve regulated lead acid battery and (3) a gel type electrolyte battery. Of course, other types of batteries are well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
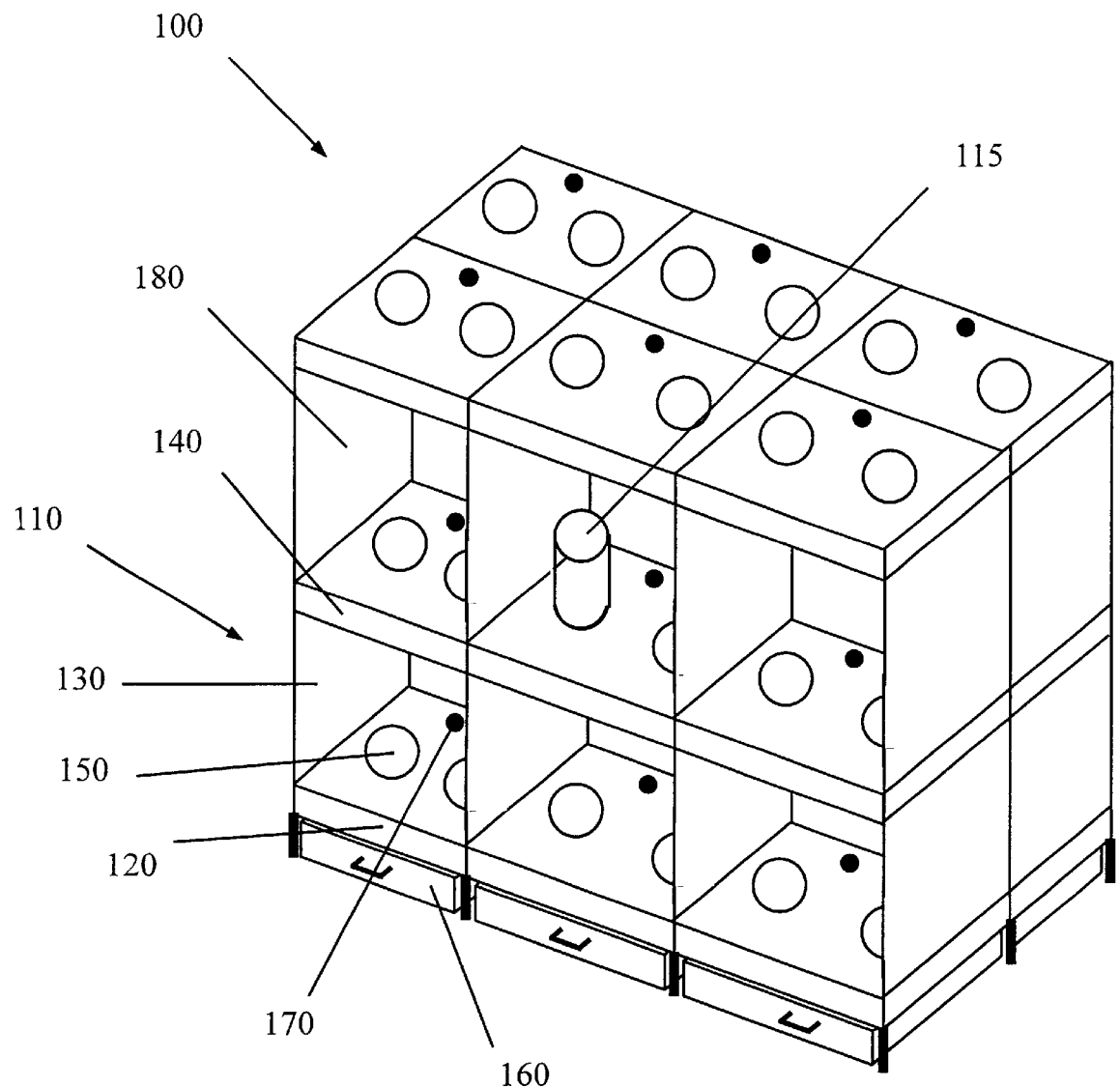
FIG. 1 illustrates an isometric view of an embodiment of a composite battery stand constructed in accordance with the principles of the present invention.

Referring initially to FIG. 1, illustrated is an isometric view of an embodiment of a composite battery stand 100 constructed in accordance with the principles of the present invention. The composite battery stand 100 includes a plurality of battery storage compartments 110, each adapted to receive a number of batteries (one of which is designated 115). Although the illustrated composite battery stand 100 has twelve battery storage compartments 110, those skilled in the pertinent art realize that the composite battery stand 100 may include any number of battery storage compartments depending on the configuration desired. This allows for flexibility when assembling the composite battery stand 100, such that many batteries 115, possibly having different shapes and sizes, may be accommodated in a limited space.

The time required to assemble a typical steel battery stand may easily be two to three days. The components of the composite battery stand 100, however, are advantageously designed to stack on and interlock with each other to minimize the amount of time required to assemble the composite battery stand 100. The illustrated composite battery stand 100, for example, may typically be assembled in only a few hours.

In the illustrated embodiment, the composite battery stand 100 is composed of a composite material, such as plastic, fiberglass, ceramic, sheet molding compound or structural foam. Of course, other composite materials may be employed as may be advantageous in a particular application.

The composite material may, in an advantageous embodiment, be a flame retardant material, such as a material that meets or exceeds U.L. 94 V-0. Those skilled in the pertinent art are familiar with a variety of flame retardant materials. The composite material may also be corrosion resistant. Using a composite material, rather than steel, provides some distinct advantages. Unlike a steel battery stand, wherein the electrolyte leaking from the battery 115 may corrode the steel and thus decrease the structural integrity of the battery stand, the composite material forming the composite battery stand 100 is generally not adversely affected by the electrolyte. Also, composite materials may be manufactured in many desirable colors, eliminating both the need for painting the composite battery stand 100 prior to assembly and the need to touch up the paint subsequent to installation.

The composite battery stand 100 may also experience lower production costs than an equivalent steel battery stand. Further, composite materials are typically less dense than steel. For this reason, the composite battery stand 100 will typically weigh much less than a comparable steel battery stand.

In the illustrated embodiment, the composite battery stand 100 includes a number of bottom shelves, one of which is designated 120. Each bottom shelf 120 acts as a base upon which a number of batteries 115 may rest. The bottom shelf 120 has a number of recessed sections (one of which is designated 150) therein to receive respective ones of the batteries 115. Of course, the recessed sections are not required by the present invention. The bottom shelf 120 further has an aperture 170 therein adapted to channel the electrolyte away from the bottom shelf 120.

The composite battery stand 100 further includes a number of removable trays (one of which is designated 160) located under the respective bottom shelves 120 and within a footprint of the composite battery stand 100. Electrolyte leaking from a battery 115 on the bottom shelf 120 may thus be channeled to the removable tray 160 via the aperture 170.

The composite battery stand 100 further includes a number of spacers (one of which is designated 130) stacked on top of the respective bottom shelves 120. Each spacer 130 is preferably designed to interlock with its respective bottom shelf 120 to form the battery storage compartments 110 wherein the batteries 115 are housed. In the illustrated embodiment, the height of the spacer 130 is designed to accommodate batteries 115 having different heights. Providing a universal spacer 130 that accommodates many different heights of batteries 115 may be economically advantageous. However, those skilled in the art should readily appreciate that the spacer 130, when needed, may be customized to fit batteries having nonstandard dimensions. Of course, a number of spacers 130 may be employed as necessary.

The composite battery stand 100 further includes a number of second shelves (one of which is designated 140) stacked on top of the respective spacers 130. In the illustrated embodiment, the second shelf 140 is similar to the bottom shelf 120. Of course, the second shelf 140 need not be similar to the bottom shelf 120. The second shelf 140 is interlocked with the spacer 130 and not only completes the battery storage compartment 110, but also provides a base upon which a second spacer 180 may be placed to form another battery storage compartment.

Figure 2:
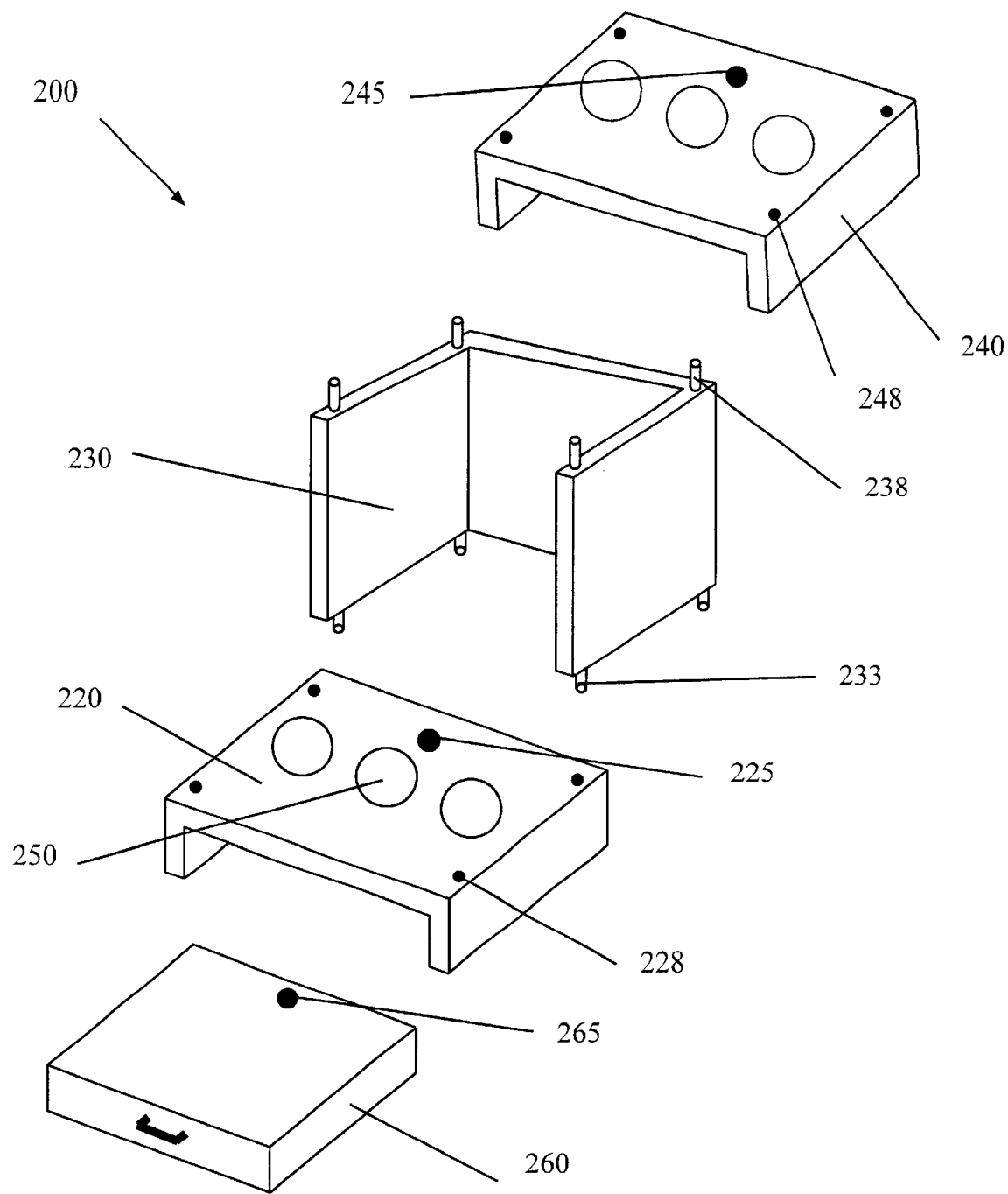
FIG. 2 illustrates an exploded isometric view of another embodiment of a composite battery stand constructed in accordance with the principles of the present invention.

Turning now to FIG. 2, illustrated is an exploded isometric view of another embodiment of a composite battery stand 200, constructed in accordance with the principles of the present invention. Batteries, such as flooded electrolyte batteries, valve regulated lead acid batteries and gel type electrolyte batteries typically housed in the composite battery stand 200 may explode or leak electrolyte, such as acid, due to, among other things, age, excessive use, manufacturing defect or abuse. Of course, the present invention may also be used with other batteries not listed herein. The electrolyte is generally hazardous and should be removed from the composite battery stand 200. The composite battery stand 200 of the present invention, therefore, advantageously includes an integral spill containment system, including a removable tray 260 positioned under a bottom shelf 220 of the composite battery stand 200. The removable tray 260 is preferably positioned to receive and contain the electrolyte spilled from the batteries housed on the shelves of the composite battery stand 200.

In the illustrated embodiment, the removable tray 260 alleviates the problems associated with the prior art spill containment system by containing the electrolyte in an enclosed container, making the clean up and removal of the electrolyte more manageable. The removable tray 260 includes a tray aperture 265 located on the top side thereof. The tray aperture 265 forms a drain through which the electrolyte spilled from the batteries may enter the removable tray 260. Of course, the removable tray 260 need not be an enclosed container having a tray aperture 265. Those skilled in the pertinent art will realize that other embodiments of the removable tray 260, including those having an open top, are well within the broad scope of the present invention. The removable tray 260 may contain an electrolyte neutralizing material to neutralize the electrolyte collected within the removable tray 260. Of course, the electrolyte neutralizing material is not required by the principles of the present invention. The removable tray 260 may also contain an electrolyte trapping material that traps or absorbs the electrolyte to allow safe disposal thereof. Of course, the removable tray 260 may contain a material that neutralizes and traps the electrolyte therein.

The bottom shelf 220 has a bottom shelf aperture 225 positioned substantially directly above the tray aperture 265 of the removable tray 260. The bottom shelf aperture 225 assists in channeling the electrolyte away from the bottom shelf 220 such that it can be confined in the removable tray 260 and easily discarded.

The bottom shelf 220 further has a number of round recessed sections (one of which is designated 250) located therein, each adapted to receive a round battery. Those skilled in the pertinent art realize that other recessed sections, other than the round recessed section 250, may be substituted as required by the particular battery to be housed on the bottom shelf 220. Alternatively, other mechanisms, may be employed to secure the battery in the bottom shelf 220.

In the illustrated embodiment, the bottom shelf 220 includes four stud receptacles (one of which is designated 228). The stud receptacles 228 are adapted to receive studs that sufficiently stabilizes the composite battery stand 200 to meet the seismic design requirements as defined by Bellcore GR63-CORE or other seismic building codes. While the studs and stud receptacles 228 illustrated and described with respect to FIG. 2 are sufficient to comply with the requirements of some of the seismic zones, other bracing might be required in zones experiencing greater seismic activity.

The composite battery stand 200 further includes a spacer 230 that interlocks with the bottom shelf 220 via four interlocking studs 233. The interlocking studs (one of which is designated 233) are received in the respective stud receptacles 228 of the bottom shelf 220. In the illustrated embodiment, the interlocking studs 233 are molded into the spacer 230. Of course, the interlocking studs 233 may be separately manufactured and plugged into the stud receptacles 228. The interlocking studs 233 and the stud receptacles 228 should form a sufficient mechanical coupling to conform to requirements of some of the seismic zones.

The composite battery stand 200 further includes a second shelf 240. In the illustrated embodiment, the second shelf 240 is substantially similar to the bottom shelf 220. Of course, the second shelf 240 need not be similar to the bottom shelf 220 but may be designed to support a different type of battery. The second shelf 240 interlocks with the spacer 230 to complete a battery storage compartment. Stud receptacles (one of which is designated 248) located on the second shelf 240 receive the interlocking studs (one of which is designated 238) protruding upward from the spacer 230. Thus, the composite battery stand 200 should be sufficiently interlocked to withstand the seismic requirements of some of the seismic zones. In the illustrated embodiment, the second shelf 240 contains a second shelf aperture 245 that allows electrolyte spilled from any of the batteries housed on the second shelf (or another shelf above the second shelf) to drain through the second shelf aperture 245 to the removable tray 260.

Figure 3:
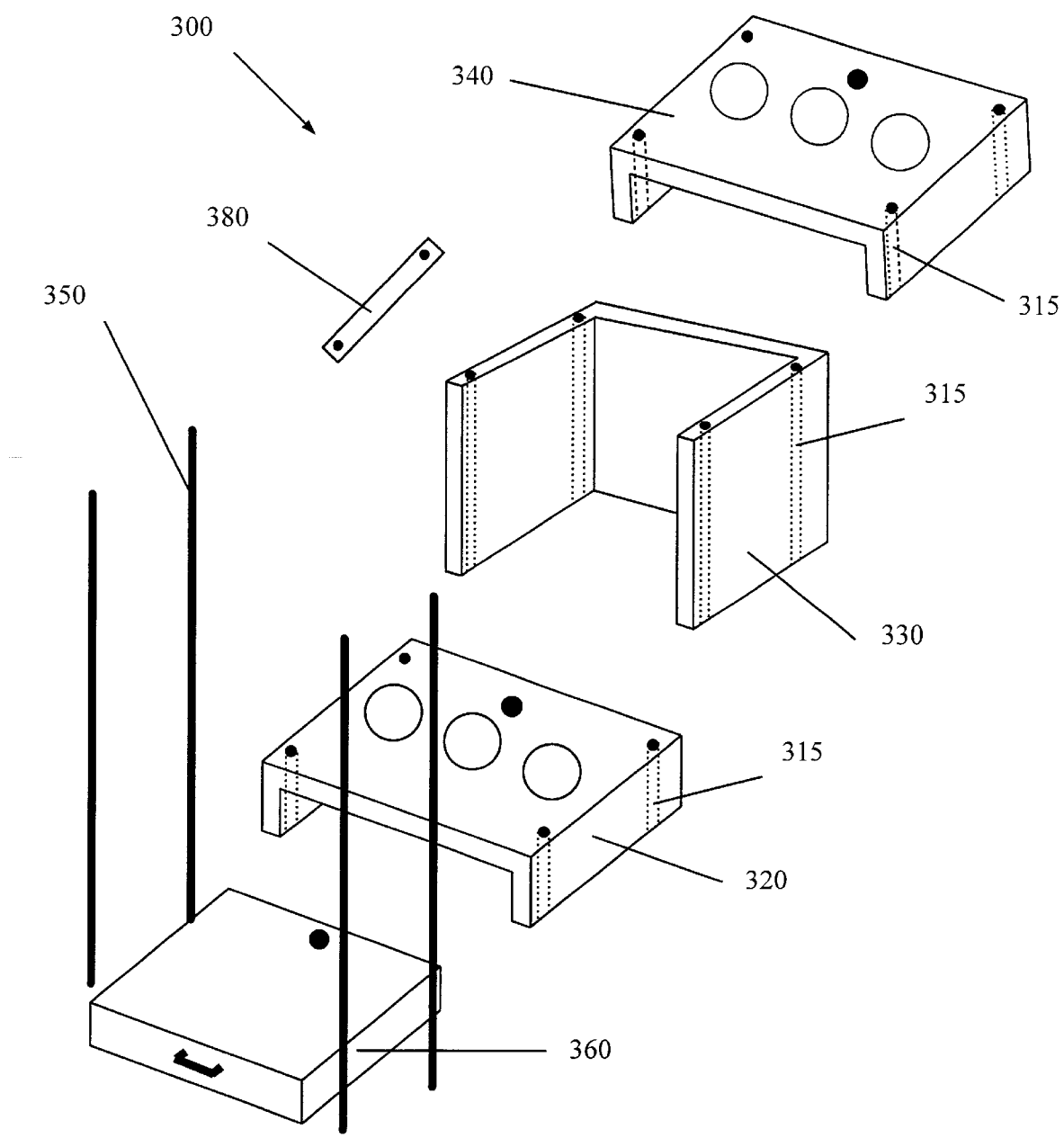
FIG. 3 illustrates an exploded isometric view of another embodiment of composite a battery stand constructed in accordance with the principles of the present invention.

Turning now to FIG. 3, illustrated is an exploded isometric view of another embodiment of a composite battery stand 300 constructed in accordance with the principles of the present invention. The composite battery stand 300 includes a bracing system constructed to conform to the seismic requirements as defined by Bellcore GR63-CORE or other seismic building codes. The bracing system includes four threaded metal bars (one of which is designated 350) that interconnect with the components of the composite battery stand 300. While the illustrated embodiment employs threaded metal bars 350 constructed of steel, those skilled in the pertinent art will realize that any material, whether threaded or not, that provides the stability required to meet certain seismic requirements may be used.

The composite battery stand 300 includes a removable tray 360, a bottom shelf 320, a spacer 330 and a second shelf 340. In the illustrated embodiment, each component of the composite battery stand 300, with the exception of the removable tray 360, advantageously includes hollow portions (one of which is designated 315) formed therewithin. The hollow portions 315 are located at the corners of the components and are used to receive the threaded metal bars 350 discussed above. In the illustrated embodiment, the hollow portions 315 are formed within the composite battery stand and thus do not protrude beyond the footprint of the composite battery stand 300.

The threaded metal bars 350 are preferably mechanically coupled to the concrete foundation of the battery plant. In the illustrated embodiment, a number of holes are drilled into the concrete foundation. Anchors are then placed within the holes. The threaded metal bars 350 are then screwed into the respective anchors to form a solid structure. Of course, any method of coupling the threaded metal bars 350 to the foundation may be employed.

To construct the composite battery stand 310, the bottom shelf 320 is lowered over the threaded metal bars 350, with the hollow portions 315 of the bottom shelf 320 receiving the threaded metal bars 350 therethrough. Once the bottom shelf 320 is lowered completely to the ground, the spacer 330 is stacked on top of the bottom shelf 320, with the hollow portions 315 of the spacer 330 receiving the threaded metal bars 350. Next, the second shelf 340 is lowered on top of the spacer 330.

An advantageous embodiment of the composite battery stand 300 employs a metal strap 380 that fits over two of the threaded metal bars 350. The strap 380 may then be locked in place, for example, by two locking nuts. The metal strap 380 and the locking nuts may thus brace the composite battery stand 300 with respect to the foundation. A second metal strap may be employed to brace the other side of the composite battery stand 300. If the composite battery stand 300 is designed with more than one battery storage compartment 310, the threaded metal bars 350 can be replaced with longer threaded metal bars and the metal strap 380 may be placed on the top-most shelf. Strapping the entire composite battery stand 300 to the foundation should be sufficient to meet more stringent seismic requirements.

Figure 4:
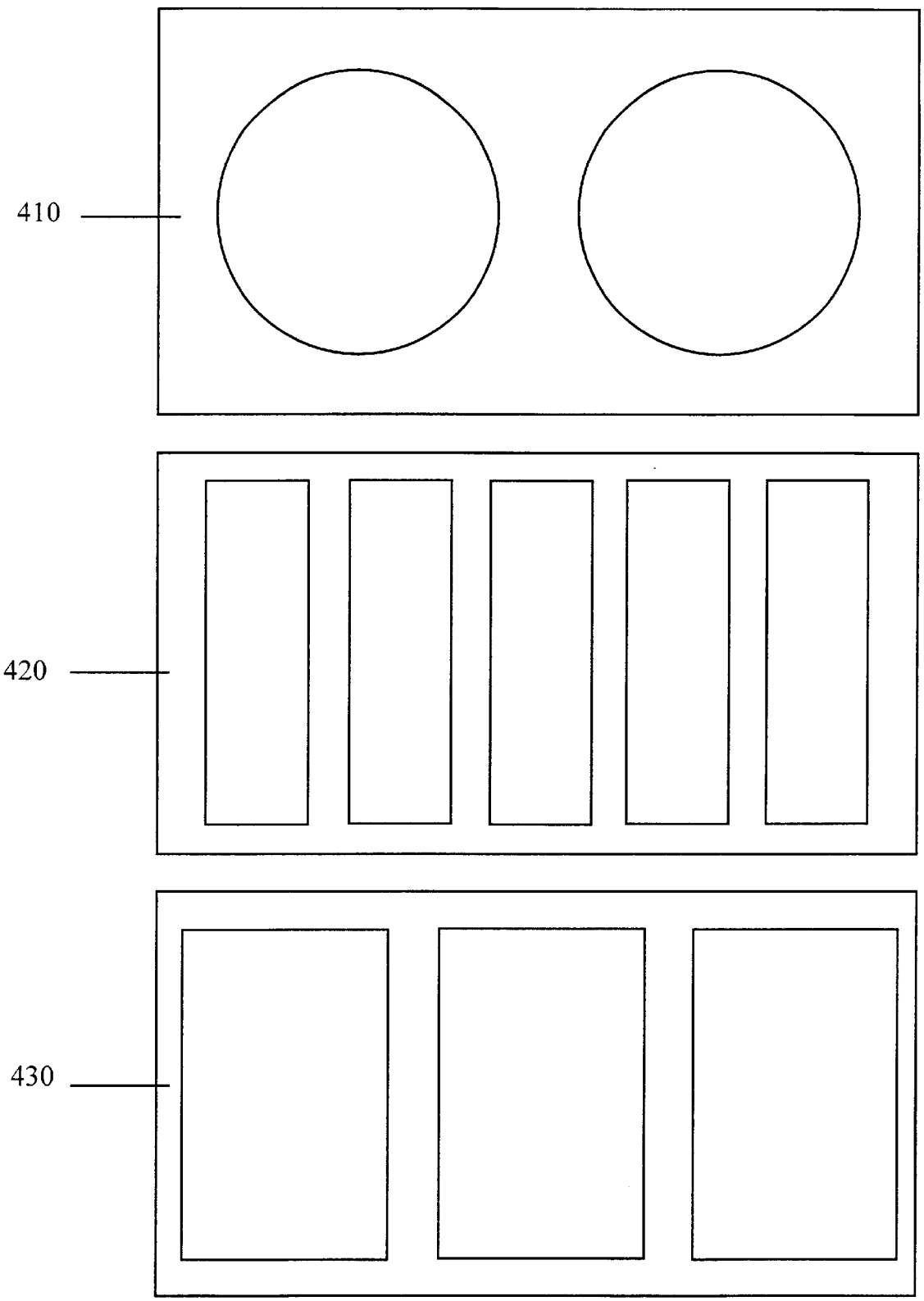
FIG. 4 illustrates a top view of various embodiments of optional recessed sections employable in a shelf in accordance with the principles of the present invention.

Turning now to FIG. 4, illustrated is a top view of embodiments of optional recessed sections employable in a shelf in accordance with the principles of the present invention. More specifically, a round recessed section 410, a skinny rectangular recessed section 420 and a fat rectangular recessed section 430 are illustrated and are adapted to receive a specific size of battery. Those skilled in the pertinent art should realize that the recessed sections 410, 420, 430 are not an exhaustive list and that other shapes of recessed sections may be used to accommodate batteries of different sizes and shapes. Those skilled in the pertinent art will also realize that the recesses are not an integral part of the present invention, and that other ways of securing the battery to the shelf are well within the broad scope of the present invention.

Although the present invention has been described in detail, those skilled in the art should understand that they can make various changes, substitutions and alterations herein without departing from the spirit and scope of the invention in its broadest form.

What is claimed is:

1. For use with a composite battery stand having a shelf adapted to receive at least one battery subject to leaking electrolyte, an integral spill containment system, comprising:

an aperture, located in said shelf, adapted to channel said electrolyte away from said shelf; and a removable tray, located under said shelf and within a footprint of said battery stand, adapted to collect said electrolyte via said aperture thereby containing said electrolyte within said footprint of said battery stand.

2. The system as recited in claim 1 wherein said shelf comprises a flame retardant composite material.

3. The system as recited in claim 1 wherein said shelf comprises a corrosion resistant composite material.

4. The system as recited in claim 1 wherein said shelf comprises a recessed section therein to receive said at least one battery.

5. The system as recited in claim 1 wherein said removable tray contains an electrolyte neutralizing material.

6. The system as recited in claim 1 wherein said removable tray contains an electrolyte trapping material.

7. The system as recited in claim 1 wherein said shelf is a bottom shelf of said battery stand, said battery stand further comprising a spacer and a second shelf that stacks on and interlocks with said bottom shelf.

8. The system as recited in claim 1 wherein said shelf is adapted to receive at least one battery selected from the group consisting of:

a flooded electrolyte battery, a valve regulated lead acid battery, and a gel type electrolyte battery.

9. For use with a composite battery stand having a shelf adapted to receive at least one battery subject to leaking electrolyte, a method of containing said electrolyte, comprising:

channeling said electrolyte away from said shelf with an aperture located therein; and collecting said electrolyte via said aperture with a removable tray, located under said shelf and within a footprint of said battery stand, thereby containing said electrolyte within said footprint of said battery stand.

10. The method as recited in claim 9 wherein said shelf comprises a flame retardant composite material.

11. The method as recited in claim 9 wherein said shelf comprises a corrosion resistant composite material.

12. The method as recited in claim 9 wherein said shelf comprises a recessed section therein to receive said at least one battery.

13. The method as recited in claim 9 further comprising neutralizing said electrolyte with an electrolyte neutralizing material contained in said removable tray.

14. The method as recited in claim 9 further comprising trapping said electrolyte with an electrolyte trapping material contained in said removable tray.

15. The method as recited in claim 9 wherein said shelf is a bottom shelf of said battery stand, said battery stand further comprising a spacer and a second shelf that stacks on and interlocks with said bottom shelf.

16. The method as recited in claim 9 wherein said shelf is adapted to receive at least one battery selected from the group consisting of:

a flooded electrolyte battery, a valve regulated lead acid battery, and a gel type electrolyte battery.

17. A composite battery stand, comprising:

a first shelf adapted to receive a first battery subject to leaking electrolyte;

a spacer stackable on and interlocking with said first shelf;

a second shelf, stackable on and interlocking with said spacer, adapted to receive a second battery; and a spill containment system, including:

an aperture, located in said shelf, adapted to channel said electrolyte away from said shelf, and a removable tray, located under said shelf and within a footprint of said battery stand, adapted to collect said electrolyte via said aperture thereby containing said electrolyte within said footprint of said battery stand.

18. The battery stand as recited in claim 17 wherein said first and second shelves comprise a flame retardant composite material.

19. The battery stand as recited in claim 17 wherein said first and second shelves comprise a corrosion resistant composite material.

20. The battery stand as recited in claim 17 wherein said first and second shelves comprise recessed sections respectively therein to receive said first and second batteries, respectively.

21. The battery stand as recited in claim 17 wherein said removable tray contains an electrolyte neutralizing material.

22. The battery stand as recited in claim 17 wherein said removable tray contains an electrolyte trapping material.

23. The battery stand as recited in claim 17 wherein said first shelf is a bottom shelf of said battery stand.

24. The battery stand as recited in claim 17 wherein said first shelf and said second shelf are adapted to receive a first and second battery, respectively, said first and second batteries selected from the group consisting of:

a flooded electrolyte battery, a valve regulated lead acid battery, and a gel type electrolyte battery.

\* \* \* \* \*